US008320897B2

(12) United States Patent  
Miller et al.

(10) Patent No.: US 8,320,897 B2  
(45) Date of Patent: Nov. 27, 2012

(54) METHOD AND DEVICE FOR PROGRAMMING INTER-(SUB) SYSTEM INTERFACE IDENTITY DATA AT A UNIT OR INDIVIDUAL SUBSCRIBER

(75) Inventors: Trent J. Miller, West Chicago, IL (US); Scott J. Pappas, Lake Zurich, IL (US); Brian R. Poe, Cary, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 766 days.

(21) Appl. No.: 12/495,249

(22) Filed: Jun. 30, 2009

(65) Prior Publication Data

US 2010/0330973 A1 Dec. 30, 2010

(51) Int. Cl.
*H04M 3/00* (2006.01)
(52) U.S. Cl. ..................................... 455/418
(58) Field of Classification Search .................. 455/418, 455/518, 519, 404.2, 456.1–456.6; 370/328, 370/473, 270, 312, 432, 276, 277, 401, 444, 370/379, 390, 321, 319, 322, 323, 330
See application file for complete search history.

(56) References Cited

U.S. PATENT DOCUMENTS

| 7,085,365 | B2 | 8/2006 | Kauppinen | |
|---|---|---|---|---|
| 7,444,160 | B1 * | 10/2008 | Fournier et al. | 455/518 |
| 7,623,469 | B2 * | 11/2009 | Kuure et al. | 370/252 |
| 7,715,422 | B2 * | 5/2010 | Hasegawa | 370/432 |
| 7,974,651 | B2 * | 7/2011 | Balo | 455/518 |
| 2008/0298293 | A1 | 12/2008 | Hiben | |
| 2010/0057639 | A1 * | 3/2010 | Schwarz et al. | 705/400 |

FOREIGN PATENT DOCUMENTS

EP 1921825 A1 5/2008

OTHER PUBLICATIONS

PCT International Search Report Dated Oct. 21, 2010.
Tom Hengeveld, TYCO Electronics, "Project 25 ISSI Support for Supplementary Data", Mar. 20, 2006, pp. 1-35; XP002606152.
Roy McClellan, "Inter Sub-System Interface—ISSI EADS ISSI White Paper"; July 1, 2006; Pagews 1-20; XP007905878.
"Project 25 Inter-RF Subsystem Interface Messages and Procedures for Voice Services: TIA-102.BACA"; EIA/TIA Standards, Telecommunications Industry Associations, Arlington, VA, USA; Aug. 1, 2006, p. 46-51.
OMA, Open Mobile alliance., "OMA Enabler Releases (ERP)," accessed at http://www.openmobilealliance.org/Technical/released_enablers.aspx, pp. 2.
International Preliminary Report on Patentability and Written Opinion for counterpart International Application No. PCT/US2010/039400 mailed on Jan. 12, 2012.

* cited by examiner

*Primary Examiner* — Melody Mehrpour
(74) *Attorney, Agent, or Firm* — Terri Hughes Smith; Steven A. May

(57) ABSTRACT

A method and device enables programming inter-subsystem interface (ISSI) identity data, which identifies at least one of units or groups operating in a communication network, into at least one unit associated with a first radio frequency subsystem. The method includes receiving the ISSI identity data at the first radio frequency subsystem from an ISSI communication node, wherein the ISSI identity data identifies at least one of unit information or group information associated with a second radio frequency subsystem operating in the communication network. At least a portion of the ISSI identity data is then programmed into the at least one unit associated with the first radio frequency subsystem.

21 Claims, 6 Drawing Sheets

METHOD AND DEVICE FOR PROGRAMMING INTER-(SUB) SYSTEM INTERFACE IDENTITY DATA AT A UNIT OR INDIVIDUAL SUBSCRIBER

FIELD OF THE DISCLOSURE

The present invention relates generally to wireless communication networks, and in particular to programming inter-subsystem interface (ISSI) identity data into a radio unit associated with a radio frequency subsystem and/or programming inter-system interface (ISI) identity data in an individual subscriber associated with a switching and management infrastructure.

BACKGROUND

For many decades, half duplex two-way radio networks have provided reliable and convenient communications using limited shared radio resources. For example, "walkie-talkie" and citizens band (CB) radio networks have enabled users to maintain direct communication channels with other users over extended periods of time. The push-to-talk (PTT) and "instant on" features of half duplex radio devices provide desirable modes of wireless communication for users such as truckers, construction and industrial site personnel, military personnel, taxi dispatchers, police and fire personnel and numerous others. Many modern communication systems designed for public safety use group communications, which allow two or more participants to exchange voice, video, and other data. A floor control mechanism then dictates which device in the network is permitted to source media at a given time.

Project 25 (P25) concerns a set of standards for digital radio communications for use by various emergency response teams. P25 was established to address the need for common digital public safety radio communications standards, including PTT communications standards. The P25 suite of standards involves digital land mobile radio (LMR) services commonly used by police and fire departments, and other public safety organizations. The P25 standards define numerous internet protocol (IP) network-to-network interfaces, which provide interoperability between P25 systems. For example, these interfaces include an ISSI for PTT which was published by the Telecommunications Industry Association (TIA) in the TIA.102-BACA documents. The ISSI provides network connectivity between P25 networks and enables network administrators to connect to other local, regional, state, or federal networks. A radio frequency subsystem (RFSS) contains a PTT server which is used during a P25 PTT session, and the ISSI enables communications between PTT servers in different RFSSs. The P25 standards governing the ISSI also define which RFSS controls a PTT session, and how a controlling RFSS maintains floor control during a PTT session.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
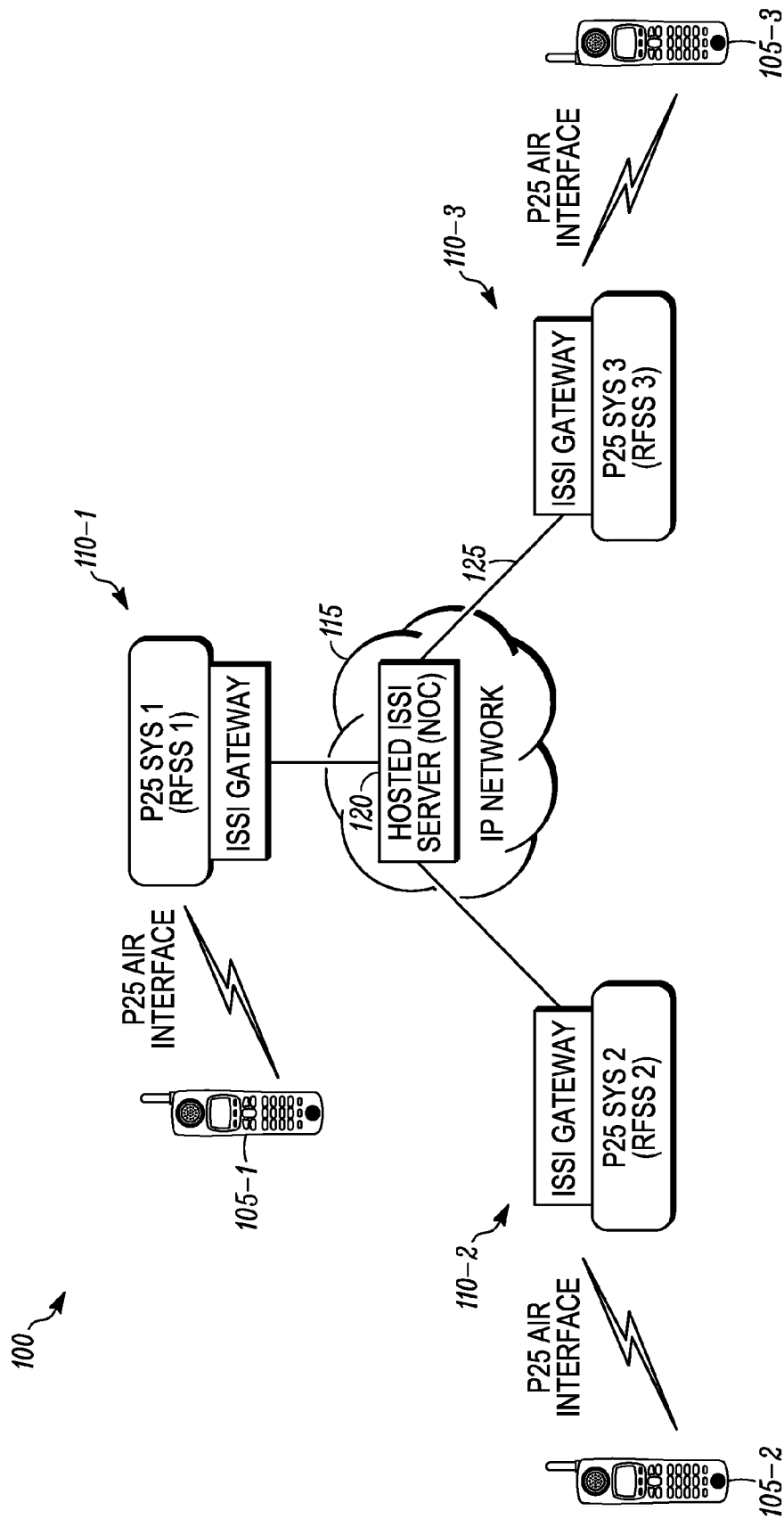
FIG. 1 is a network diagram illustrating elements of a wireless communication network including a hosted ISSI "wheel and spoke" architecture, according to the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a method executable by a computer enables programming inter-subsystem interface (ISSI) identity data, which identifies at least one of units or groups operating in a communication network, into at least one unit associated with a first radio frequency subsystem. The method includes receiving the ISSI identity data at the first radio frequency subsystem from an ISSI communication node, wherein the ISSI identity data identifies at least one of unit information or group information associated with a second radio frequency subsystem operating in the communication network. At least a portion of the ISSI identity data is then programmed into at least one unit associated with the first radio frequency subsystem. The RFSS may comprise a single network element or a plurality of network elements to receive the ISSI identity data and program at least a portion of the ISSI identity data into the at least one unit.

Embodiments of the present invention thus enable automatic advertisement of ISSI identity data that identify units or groups operating in a communication network. After unit or group ISSI identity data is advertised to another organization, the identity data or a representation thereof can be directly programmed into appropriate radio devices or made available to a P25 radio using other means, such as a directory service, address book, or web page. By enabling ISSI identity data to be automatically updated, unit and group information can be efficiently distributed, managed and synchronized across RFSSS. Thus, for example, when a group is deleted from or added to an ISSI network, other RFSSs can be automatically and promptly informed of the change.

To enable a first P25 radio from a first RFSS to perform a unit-to-unit PTT call to a second P25 radio from a second RFSS, the ISSI wide-area communication network (WACN) identity, system identity, and unit identifier of the second P25 radio must be known by the first RFSS or possibly even the first P25 radio itself. Similarly, an ISSI group is identified by a WACN identity, system identity, and group identifier which collectively defines which RFSS is home for the group. In order for participants to affiliate to an ISSI group, the WACN identity, system identity, and group identifier must be known by the participant. According to an embodiment of the present invention, identity data concerning the other unit or group can be automatically updated and distributed across RFSSs.

Referring to FIG. 1, a network diagram illustrates elements of a wireless communication network 100 including a hosted ISSI "wheel and spoke" architecture, according to the prior art. The network 100 includes P25 radios 105-$n$ that are in radio frequency (RF) communication with corresponding "home" RF subsystems 110-$n$. For example, the P25 radio 105-1 communicates over a common air interface with its home RFSS 110-1. Multiple P25 radio 105-$n$ can be registered with a RFSS 110-$n$. Each RFSS 110-$n$ is then operatively coupled via an IP network 115 to a hosted ISSI server 120. The hosted ISSI server 120 then functions as a network operations center (NOC) for the wireless communication network 100.

The P25 radios 105-$n$, also referred to as units, are generally programmed with unique group identifiers, such as a WACN identifier, a system identifier, a system group identifier (G-ID) or a local designation which can be converted to this information. A user of a P25 radio 105-$n$ generally is required to explicitly tune the radio 105-$n$, such as by turning a knob, to affiliate with a particular group using a group identifier. Groups can include any number of units and can be liberally defined to include units from different organizations or agencies.

Figure 2:
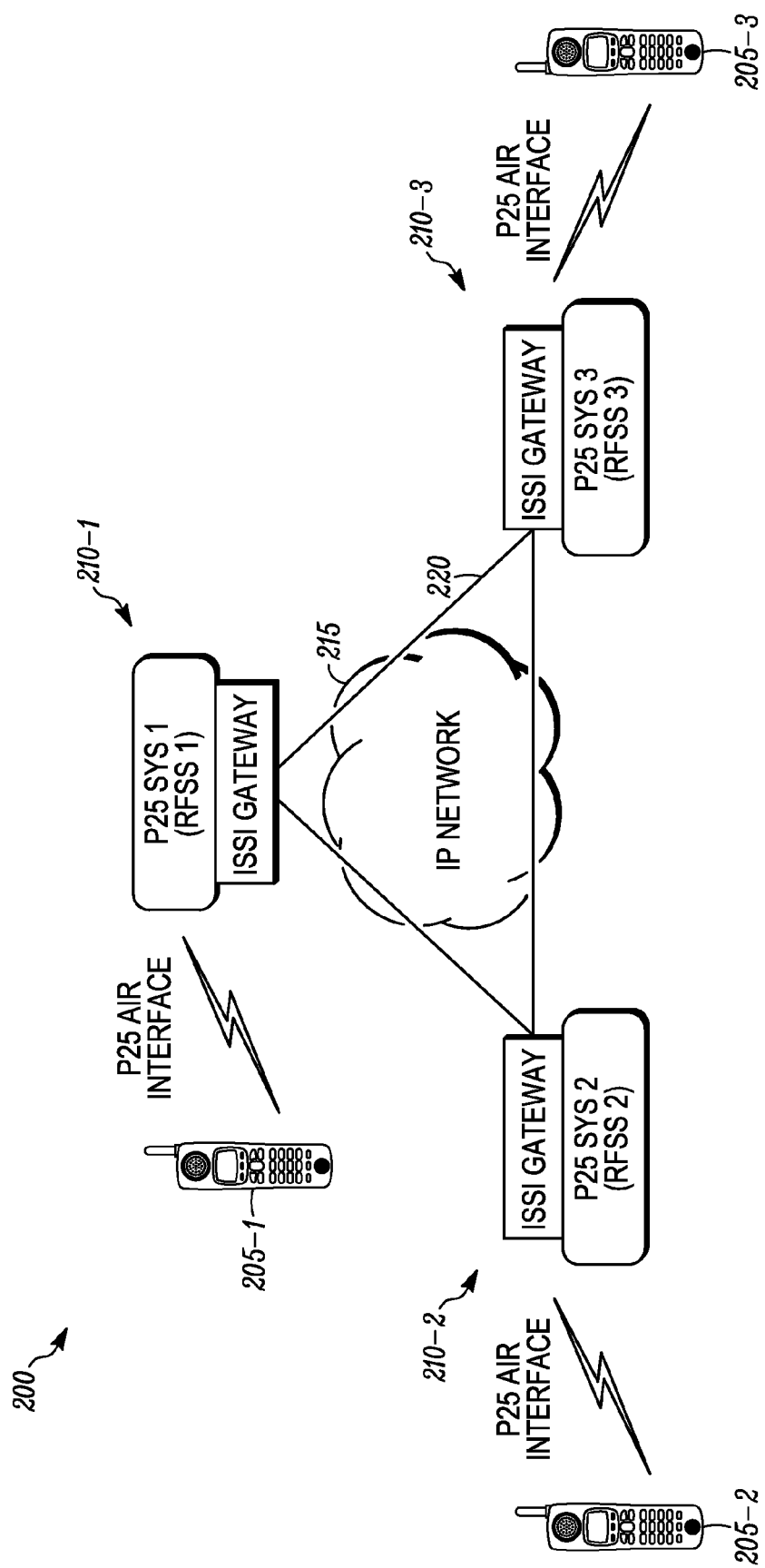
FIG. 2 is a network diagram illustrating elements of a wireless communication network including an agency-based ISSI "point-to-point mesh" architecture, according to the prior art.

Referring to FIG. 2, a network diagram illustrates elements of a wireless communication network 200 including an agency-based ISSI "point-to-point mesh" architecture, according to the prior art. Similar to the network 100 described above, the network 200 includes P25 radios 205-$n$ that are in RF communication with corresponding home RF subsystems 210-$n$. For example, the P25 radio 205-1 communicates over an air interface with RFSS 210-1. However, each RFSS 210-$n$ is operatively coupled via an IP network 215 to another RFSS 210-$n$, without the use of a hosted ISSI server.

ISSI connections between RF subsystems, such as those illustrated by the lines 125 and 220 in FIGS. 1 and 2, respectively, are generally private IP connections, which use wired local area network (LAN) or wide area network (WAN) technologies, or wireless technologies. The ISSI connections are generally made across a common carrier, such as a T1 or multiprotocol label switching (MPLS) carrier.

Embodiments of the present invention enable ISSI identity data to be programmed into radio units operating in any of various network architectures, such as the different network architectures illustrated in FIG. 1 and FIG. 2. Several exemplary models for programming such data, including a push model, a pull model, and a hybrid model, are described in detail below.

Figure 3:
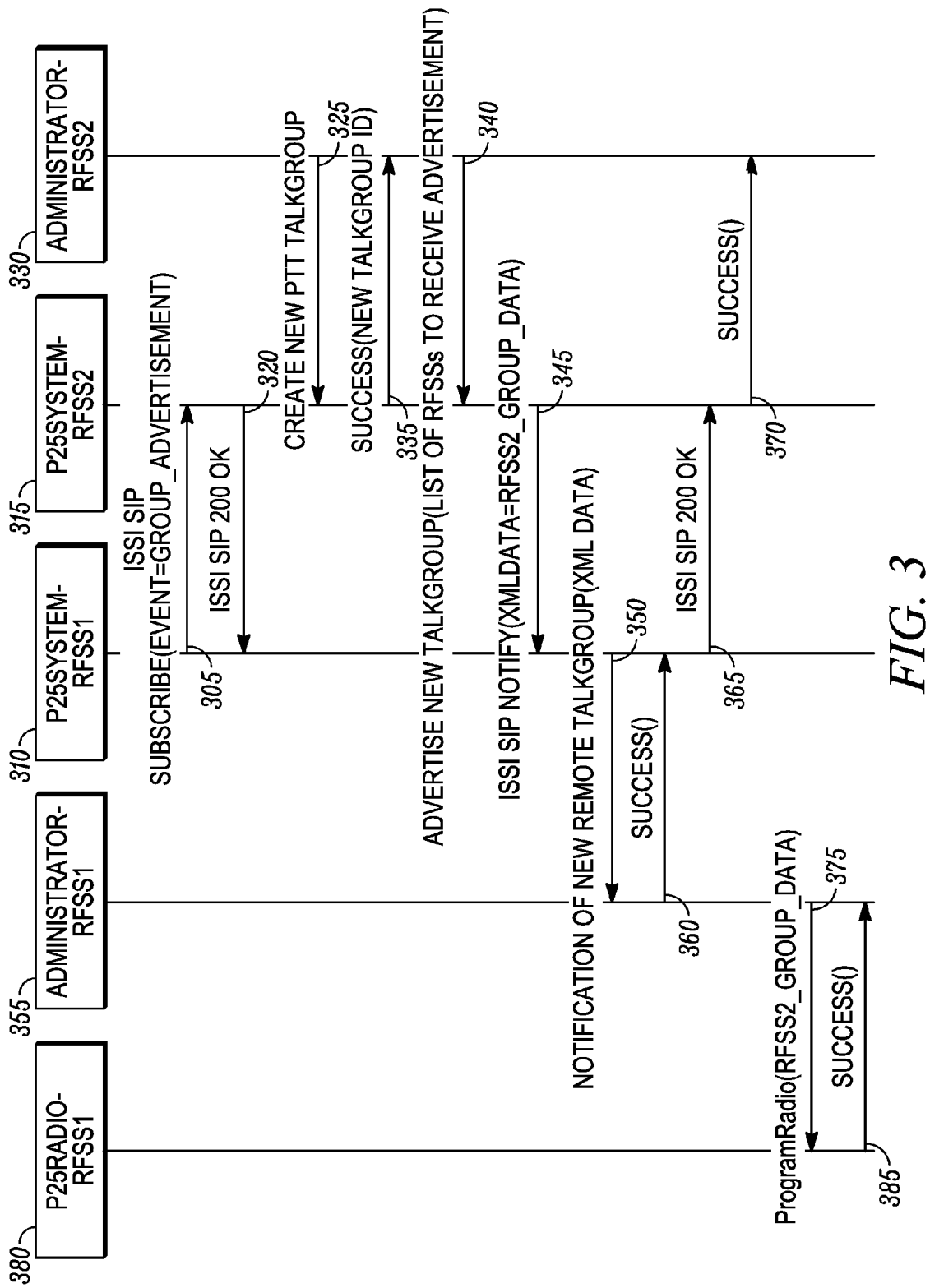
FIG. 3 is a message sequence chart illustrating a push model for transmitting ISSI identity data between radio frequency subsystems in accordance with an embodiment of the present disclosure.

Referring to FIG. 3, a message sequence chart illustrates a push model for programming ISSI identity data into a unit associated with an RFSS according to some embodiments of the present invention. First, an ISSI session initiation protocol (SIP) SUBSCRIBE message 305 is transmitted from a RFSS1 system module 310 of a first RFSS to a RFSS2 system module 315 of a second RFSS. The message 305 indicates that Event=group advertisement, and thus subscribes the RFSS1 system module 310 to a SIP subscription to ISSI user or group advertisement services offered by the RFSS2 system module 315. Next, an ISSI SIP 200 OK message 320 is transmitted from the RFSS2 system module 315 to the RFSS1 system module 310.

A create new PTT talk group message 325 is then transmitted from a RFSS2 administrator module 330 to the RFSS2 system module 315. In reply, a success message 335, including a new talk group identification, is transmitted from the RFSS2 system module 315 to the RFSS2 administrator module 330. Next, an advertise new talk group message 340 is transmitted from the RFSS2 administrator module 330 to the RFSS2 system module 315, including a list of RFSSs that should receive advertisements regarding the new talk group. It is more common in P25 systems for the administrators to create a new talk group in the system (and specify the talk group identity) rather than asking the system for an identity when creating a new talk group.

A pushed notification message in the form of an ISSI SIP NOTIFY message 345 is then sent from the RFSS2 system module 315 to the RFSS1 system module 310, including extensible markup language (XML) data that comprises ISSI identity data concerning the new talk group managed by the second RFSS. A notification of new remote talk group message 350, including the XML data, is then transmitted from the RFSS1 system module 310 to a RFSS1 administrator module 355.

A success message 360 is then transmitted from the RFSS1 administrator module 355 to the RFSS1 system module 310. That results in an ISSI SIP 200 OK message 365 being sent from the RFSS1 system module 310 to the RFSS2 system module 315, and a success message 370 being sent from the RFSS2 system module 315 to the RFSS2 administrator module 330.

A Program Radio message 375 is then transmitted from the RFSS1 administrator module 355 to a P25 radio 380 associated with the first RFSS. For example, the Program Radio message 375 can be transmitted using a cabled interface, a removable storage, or a wireless over-the-air (OTA) interface. The Program Radio message 375 includes the group data comprising the ISSI identity data or a local representation thereof concerning the new talk group managed by the second RFSS. A success message 385 is then transmitted from the P25 radio 380 to the RFSS1 administrator module 355.

As shown in FIG. 3, group data of the P25 radio 380 including ISSI identity data is thus automatically updated and synchronized with group data concerning a new PTT talk group managed by the second RFSS. As will be understood by those having ordinary skill in the art, various alternatives to the push model described above also can be used. For example, the functions of SIP NOTIFY messages can be performed by SIP MESSAGE, PUBLISH, or OPTIONS methods, or by non-SIP methods. Thus, a pushed notification message can be transmitted, for example, using one or more of the following: a SIP method, a Real-time Transport Protocol (RTP) method, and an ISSI Service Access Point (SAP) transaction.

ISSI identity data can comprise a wide range of data types including, for example, a user identifier, a unit identity (U-ID), a group identifier, a group identity (G-ID), a WACN identity (WACN-ID), a RFSS identity (RFSS-ID), a system identity (SYSTEM-ID), colloquial name data, group transport address data, unit transport address data, and peer agency identification data. Further, ISSI identity data can be transmitted in ISSI unit advertisements or ISSI group advertisements.

Figure 4:
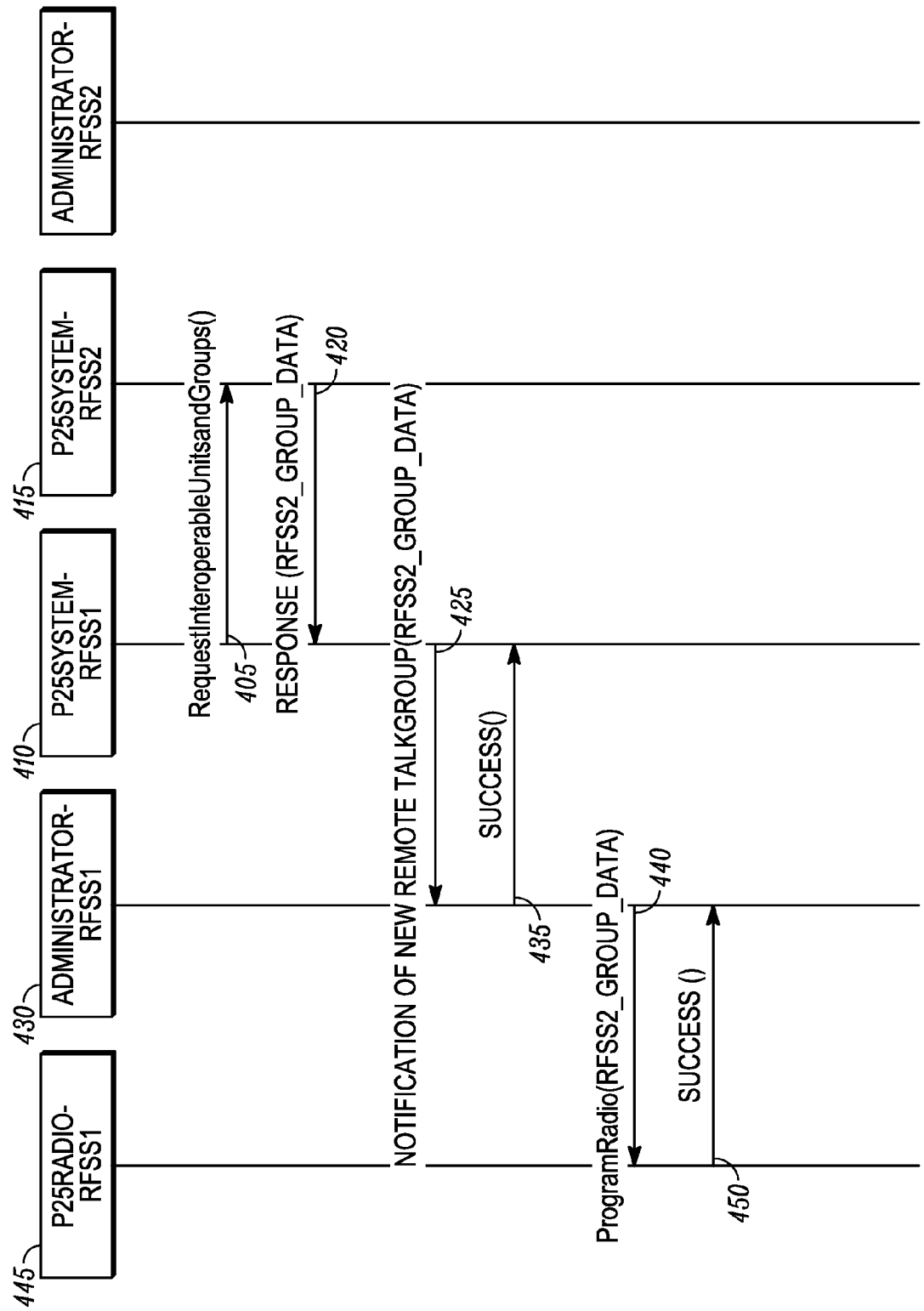
FIG. 4 is a message sequence chart illustrating a pull model for transmitting ISSI identity data between radio frequency subsystems in accordance with an embodiment of the present disclosure.

Referring to FIG. 4, a message sequence chart illustrates a pull model for programming at least a portion of the ISSI identity data into a unit associated with an RFSS according to some embodiments of the present invention. Programming at least a portion of the ISSI identity data into at least one unit associated with an RFSS is performed using at least one a cabled interface, a removable storage, or a wireless over-the-air (OTA) interface. First, a pull data request message in the form of a Request Interoperable Units and Groups message 405 is transmitted from a RFSS1 system module 410 of a first RFSS to a RFSS2 system module 415 of a second RFSS. The message 405 activates an ISSI procedure initiated by a non-home RFSS to obtain remote unit and group information from a home RFSS. The RFSS2 system module 415 then replies by transmitting a response message 420 to the RFSS1 system module 410. The response message 420 includes RFSS2_group_data that comprises ISSI identity data concerning a group or groups managed by the second RFSS. Alternatively, the response message 420 could include unit data.

The RFSS1 system module then transmits a notification of new remote talk group message 425, which includes the RFSS2_group_data, to a RFSS1 administrator module 430. The RFSS1 administrator module 430 responds by sending a success message 435 to the RFSS1 system module 410.

A Program Radio message 440 is then transmitted using a wired or wireless connection from the RFSS1 administrator module 430 to a P25 radio 445 associated with the first RFSS. The program radio message 440 includes the RFSS2_group_data or a local representation thereof comprising the ISSI identity data concerning the group or groups managed by the second RFSS. A success message 450 is then transmitted from the P25 radio 445 to the RFSS1 administrator module 430.

The pull model described above thus involves a non-home RFSS querying a home RFSS directly, or indirectly through an advertisement service, for unit or group data. Various embodiments of the pull model can employ various query-response methods, such as simple object access protocol (SOAP) or extensible markup language/hypertext transfer protocol (XML/HTTP) methods.

Figure 5:
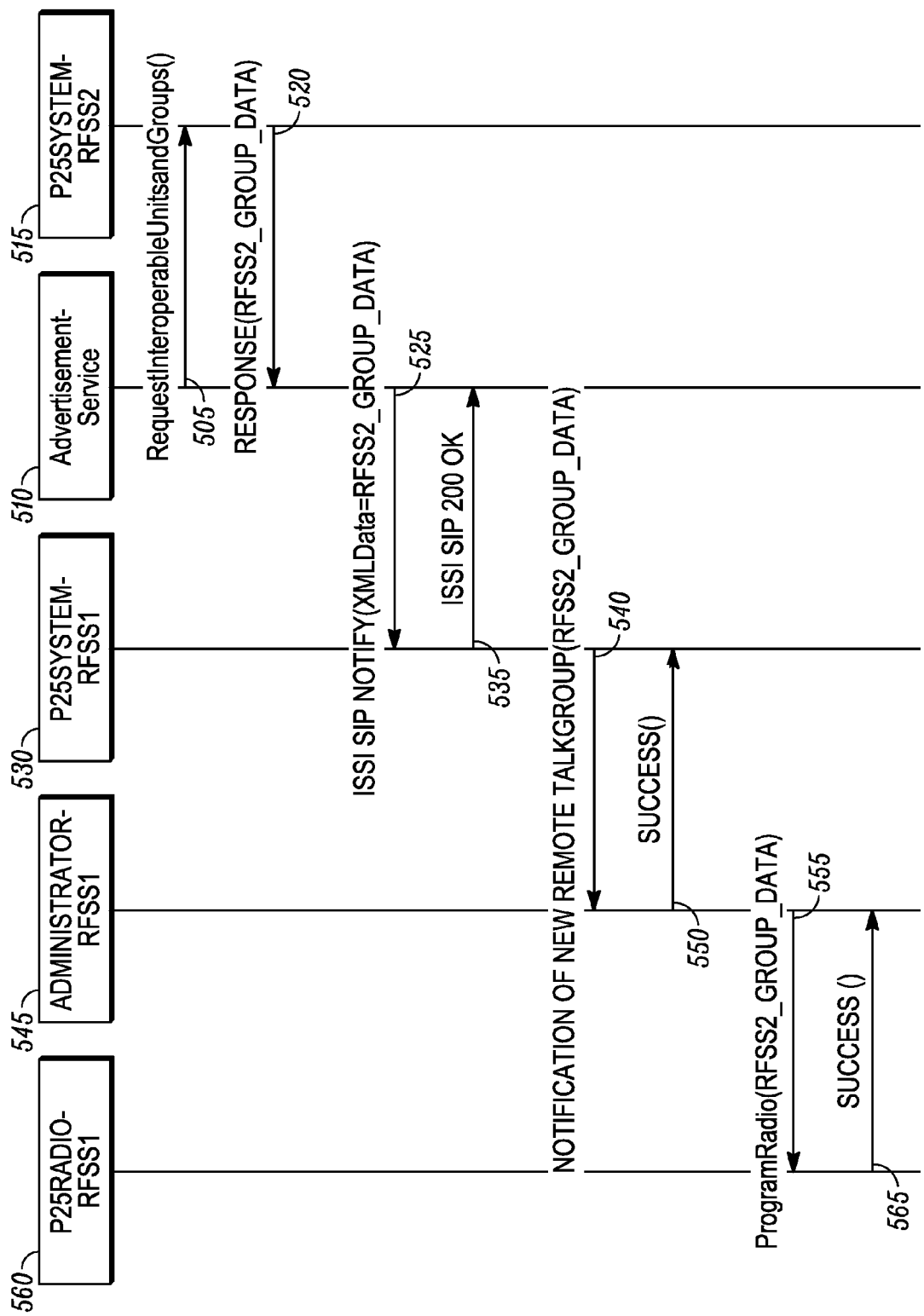
FIG. 5 is a message sequence chart illustrating a hybrid model for transmitting ISSI identity data between radio frequency subsystems in accordance with an embodiment of the present disclosure.

Referring to FIG. 5, a message sequence chart illustrates a hybrid model for programming ISSI identity data into a unit associated with an RFSS according to some embodiments of the present invention. First, a Request Interoperable Units and Groups message 505 is transmitted from a central advertisement service system 510 to a RFSS2 system module 515 of a second RFSS. The RFSS2 system module 515 then transmits a response message 520 to the central advertisement service system 510. The response message 520 includes RFSS2_group_data that comprises ISSI identity data concerning a new talk group managed by the second RFSS.

An ISSI SIP NOTIFY message 525, including the RFSS2_group_data, is then sent from the central advertisement service system 510 to a RFSS1 system module 530. An ISSI SIP 200 OK message 535 is then sent from the RFSS1 system module 530 to the central advertisement service system 510. Next, a notification of new remote talk group message 540, including the RFSS2_group_data, is transmitted from the RFSS1 system module 530 to an RFSS1 administrator module 545. A success message 550 is then transmitted from the RFSS1 administrator module 545 to the RFSS1 system module 530.

Finally, a Program Radio message 555 is transmitted using a wired or wireless connection from the RFSS1 administrator module 545 to a P25 radio 560 associated with the first RFSS. The Program Radio message 555 includes the RFSS2_group_data comprising the ISSI identity data or a local representation thereof concerning the new talk group managed by the second RFSS. A success message 565 is then transmitted from the P25 radio 560 to the RFSS1 administrator module 545.

In each of the push, pull and hybrid models described above with reference, respectively, to FIGS. 3, 4 and 5, a communication link is established between a first RFSS1 system module and an ISSI communication node. The ISSI communication node is either a second RFSS or a central advertising system. The communication link can include an ISSI communication link or other type of communication link, such as a communication link including an Internet based service that publishes ISSI identity data. Establishing the communication link between the RFSS1 system module and the ISSI communication node may use, for example, one or more of the following: a SIP method, a RTP method, and an ISSI Service Access Point (SAP) transaction, or other protocol. Also, establishing the ISSI communication link may comprise transmitting from the RFSS1 system module to the ISSI communication node a request to receive advertisements of ISSI identity data.

Figure 6:
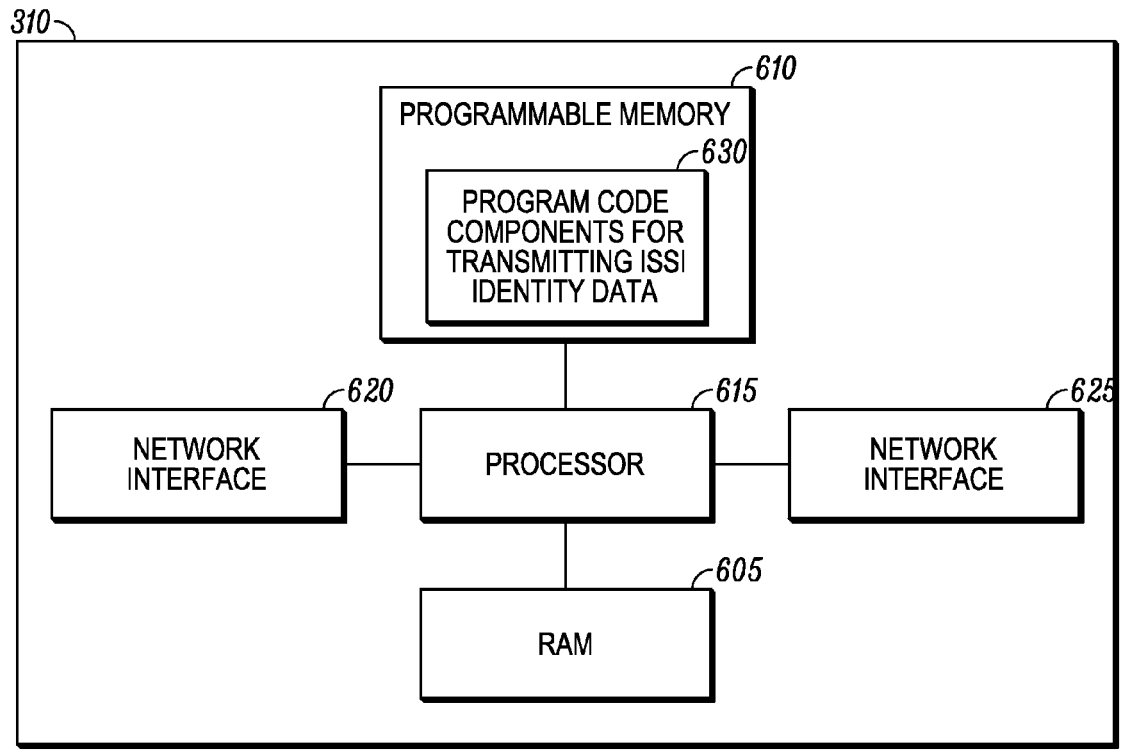
FIG. 6 is a block diagram illustrating components of a radio frequency subsystem system module in accordance with an embodiment of the present disclosure.

Referring to FIG. 6, a block diagram illustrates components of a radio frequency subsystem system module, such as the RFSS1 system modules 310, 410, and 530 described above, according to some embodiments of the present invention. The RFSS1 system module 310, for example, can be included in various types of devices, including an integrated unit containing at least all the elements depicted in FIG. 6, as well as any other elements necessary for the RFSS1 system module 310 to perform its particular functions. Alternatively, the RFSS1 system module 310 can comprise a collection of appropriately interconnected units or devices, wherein such units or devices perform functions that are equivalent to the functions performed by the elements depicted in FIG. 6.

The RFSS1 system module 310 comprises a random access memory (RAM) 605 and a programmable memory 610 that are coupled to a processor 615. The processor 615 also has ports for coupling to network interfaces 620, 625. The network interfaces 620, 625, which for example may be wired or wireless network interfaces, can be used to enable the RFSS1 system module 310 to communicate with other network devices such as other RFSS system modules, RFSS administrator modules, central advertisement service systems, and P25 radios.

The programmable memory 610 can store operating code (OC) for the processor 615 and code for performing functions associated with an RFSS. For example, the programmable memory 610 can store computer readable program code components 630 configured to cause execution of a method for programming ISSI identity data into a unit associated with a radio frequency subsystem, as described herein.

Figure 7:
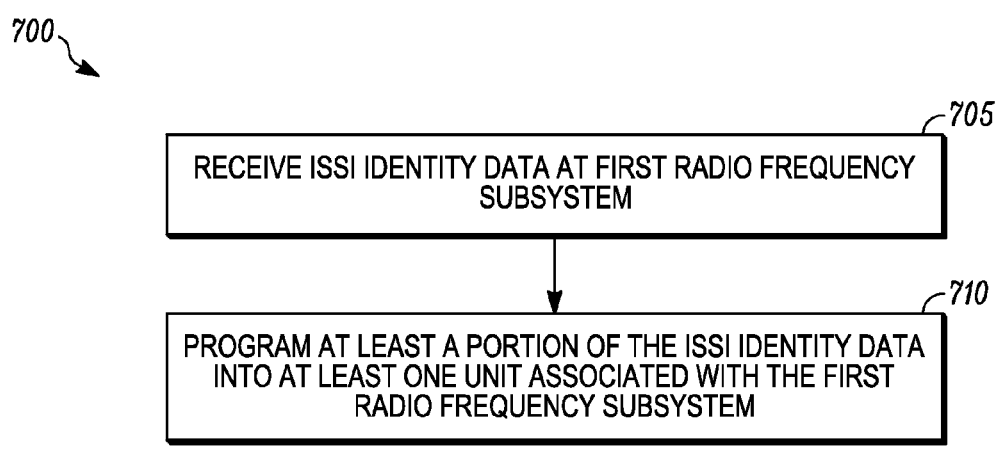
FIG. 7 is a general flow diagram illustrating a method for programming ISSI identity data into a unit associated with a radio frequency subsystem in accordance with an embodiment of the present disclosure.

Referring to FIG. 7, a general flow diagram illustrates a method 700 for programming ISSI identity data, which identifies at least one of units or groups operating in a communication network, into at least one unit associated with a first radio frequency subsystem, according to some embodiments of the present invention. At step 705, the ISSI identity data is received at the first radio frequency subsystem from an ISSI communication node, wherein the ISSI identity data identifies at least one of unit information or group information associated with a second radio frequency subsystem operating in the communication network. For example, as described above concerning the push model, the ISSI identity data is received at the RFSS1 system module 310 from the RFSS2 system module 315 in the ISSI SIP NOTIFY message 345. Alternatively, as described above concerning the pull model, the ISSI identity data is received at the RFSS1 system module 410 from the RFSS2 system module 415 in the response message 420. Alternatively, as described above concerning the hybrid model, the ISSI identity data is received at the RFSS1 system module 530 from the central advertisement service system 510 in the ISSI SIP NOTIFY message 525. As will be understood by those having ordinary skill in the art, the first radio frequency subsystem can be of various types, including a project 25 (P25) radio frequency subsystem or a terrestrial trunked radio (TETRA) inter system interface (ISI) radio frequency subsystem.

The ISSI unit information may include, for example, a session initiation protocol (SIP) uniform resource identifier (URI), a subscriber unit identity (SU-ID), a unit identity (U-ID), a wide area communication network identity (WACN-ID), a system identity (SYSTEM-ID), or a radio frequency subsystem identity (RFSS-ID). The ISSI group information may include, for example, the SIP URI, a subscriber group identity (SG-ID), a group identity (G-ID), the WACN-ID, the SYSTEM-ID, or the RFSS-ID.

At step 710, at least a portion of the ISSI identity data is programmed into at least one unit associated with the first radio frequency subsystem. For example, as described above concerning the push model, the ISSI identity data is transmitted from the RFSS1 system module 310 to the RFSS1 administrator module 355 in the notification of new remote talk group message 350. The Program Radio message 375 is then transmitted using a wired or wireless connection from the RFSS1 administrator module 355 to a P25 radio 380 associated with the first RFSS.

Advantages of some embodiments of the present invention therefore include enabling automatic advertising of ISSI identity data that identifies units or groups operating in a communication network. After unit or group ISSI identity data is advertised to another radio frequency subsystem, the identity data, or a local representation thereof, can be automatically programmed using a wired or wireless interface into appropriate radio devices, such as P25 radios. In alternate embodiments, a directory, web page, or other data service can be used to advertise the remote ISSI units and groups to the local P25 radio. By enabling ISSI identity data to be automatically updated, unit and group information can be efficiently distributed, managed and synchronized across organizations. Thus, for example, when an ISSI group is deleted from or added to a home RFSS, other RFSSs can be automatically and promptly informed of the change.

In the foregoing specification, specific embodiments have been described. However, one of ordinary skill in the art appreciates that various modifications and changes can be made without departing from the scope of the invention as set forth in the claims below. Although the specific examples relate to APCO P25, the invention is also applicable to TETRA-based systems. This specification uses terminology from the P25 ISSI specification which has equivalent terminology in the European Telecommunications Standards Institute (ETSI) Inter-System Interface (ISI) specifications.

| APCO P25 ISSI Terms | ETSI ISI Terms |
|---|---|
| ISSI (Inter-Subsystem Interface) | ISI (Inter-System Interface) |
| RFSS (Radio Frequency Subsystem) | SwMI (Switching and Management Infrastructure) |
| SU-ID (Subscriber Unit Identity) | ITSI (Individual TETRA Subscriber Identity) |
| SG-ID (Subscriber Group Identity) | GTSI (Group TETRA Subscriber Identity) |
| WACN and System ID | MNI (Mobile Network Identity) |

Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover, in this document relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g. comprising a processor) to perform a method as described and claimed herein. Examples of such computer-readable storage mediums include, but are not limited to, a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method executable by a computer for programming inter-subsystem interface (ISSI) identity data, which identifies at least one of remote units or groups operating in a communication network, into at least one unit associated with a first radio frequency subsystem, the method comprising:
receiving the ISSI identity data at the first radio frequency subsystem from an ISSI communication node, wherein the ISSI identity data identifies at least one of remote unit information or group information associated with a second radio frequency subsystem operating in the communication network; and
programming at least a portion of the ISSI identity data into the at least one remote unit associated with the first radio frequency subsystem.

2. The method of claim 1, wherein receiving the ISSI identity data at the first radio frequency subsystem comprises receiving a pushed notification message having the ISSI identity data.

3. The method of claim 1, wherein receiving the ISSI identity data at the first radio frequency subsystem is in response to a pull data request message transmitted from the first radio frequency subsystem to the ISSI communication node.

4. The method of claim 1, wherein the ISSI communication node is either the second radio frequency subsystem or a central advertisement system.

5. The method of claim 1, wherein the ISSI identity data comprises data selected from one or more of the following: a user identifier, a unit identity, a group identifier, a group identity, a wide area communications network (WACN) identity, a radio frequency subsystem identity, system identity, colloquial name data, group transport address data, unit transport address data, and peer agency identification data.

6. The method of claim 1, further comprising sending a request to receive advertisements of ISSI identity data from the ISSI communication node.

7. The method of claim 1, wherein the ISSI unit information includes at least one of: a session initiation protocol (SIP) uniform resource identifier (URI), a subscriber unit identity (SU-ID), a unit identity (U-ID), a wide area communication network identity (WACN-ID), a system identity (SYSTEM-ID), or a radio frequency subsystem identity (RFSS-ID), and wherein the ISSI group information includes at least one of: the SIP URI, a subscriber group identity (SG-ID), a group identity (G-ID), the WACN-ID, the SYSTEM-ID, or the RFSS-ID.

8. A radio frequency subsystem comprising:
a processor; and
a memory coupled to the processor, the memory including:
computer readable program code components for receiving inter-subsystem interface (ISSI) identity data at the radio frequency subsystem from an ISSI communication node, wherein the ISSI identity data identifies at least one of remote unit information or group information associated with another radio frequency subsystem; and
computer readable program code components for programming at least a portion of the ISSI identity data into at least one remote unit associated with the radio frequency subsystem.

9. The radio frequency subsystem of claim 8, wherein receiving the ISSI identity data at the radio frequency subsystem comprises receiving a pushed notification message having the ISSI identity data.

10. The radio frequency subsystem of claim 8, wherein receiving the ISSI identity data at the radio frequency subsystem is in response to a pull data request message transmitted from the radio frequency subsystem to the ISSI communication node.

11. The radio frequency subsystem of claim 8, wherein the ISSI communication node is either a radio frequency subsystem or a central advertisement system.

12. The radio frequency subsystem of claim 8, wherein the ISSI identity data comprises data selected from one or more of the following: a user identifier, a group identifier, a wide area communications network (WACN) identifier, a radio frequency subsystem identifier, system identifier data, colloquial name data, group transport address data, unit transport address data, and peer agency identification data.

13. The radio frequency subsystem of claim 8, wherein the memory further includes computer readable program code components to send a request to receive advertisements of ISSI identity data from the ISSI communication node.

14. The radio frequency subsystem of claim 8, wherein the ISSI unit information includes at least one of: a session initiation protocol (SIP) uniform resource identifier (URI), a subscriber unit identity (SU-ID), a unit identity (U-ID), a wide area communication network identity (WACN-ID), a system identity (SYSTEM-ID), or a radio frequency subsystem identity (RFSS-ID), and wherein the ISSI group information includes at least one of: the SIP URI, a subscriber group identity (SG-ID), a group identity (G-ID), the WACN-ID, the SYSTEM-ID, or the RFSS-ID.

15. A method executable by a computer for programming inter-system interface (ISI) identity data, which identifies at least one of individual subscribers or groups operating in a communication network, into at least one individual subscriber associated with a first switching and management infrastructure, the method comprising:
receiving the ISI identity data at the first switching and management infrastructure from an ISI communication node, wherein the ISI identity data identifies at least one of individual subscriber information or group information associated with a second switching and management infrastructure operating in the communication network; and programming at least a portion of the ISI identity data into the at least one individual subscriber associated with the first switching and management infrastructure.

16. The method of claim 15, wherein receiving the ISI identity data at the first switching and management infrastructure comprises receiving a pushed notification message having the ISI identity data.

17. The method of claim 15, wherein receiving the ISI identity data at the first switching and management infrastructure is in response to a pull data request message transmitted from the first switching and management infrastructure to the ISI communication node.

18. The method of claim 15, wherein the ISI communication node is either the second switching and management infrastructure or a central advertisement system.

19. The method of claim 15, wherein the ISI identity data comprises data selected from one or more of the following: an individual subscriber identifier, a group identifier, a mobile network identity (MNI), a switching and management infrastructure (SwMI) identity, colloquial name data, group transport address data, individual subscriber transport address data, and peer agency identification data.

20. The method of claim 15, further comprising sending a request to receive advertisements of ISI identity data from the ISI communication node.

21. The method of claim 15, wherein the ISI individual subscriber information includes at least one of: an individual TETRA subscriber identity (ITSI), a mobile network identity (MNI), or a switching and management infrastructure (SwMI) identity, and wherein the ISI group information includes at least one of: a group TETRA subscriber identity (GTSI), a mobile network identity (MNI), or a switching and management infrastructure (SwMI) identity.

* * * * *

UNITED STATES PATENT AND TRADEMARK OFFICE
CERTIFICATE OF CORRECTION

PATENT NO. : 8,320,897 B2
APPLICATION NO. : 12/495249
DATED : November 27, 2012
INVENTOR(S) : Miller et al.

Page 1 of 1

It is certified that error appears in the above-identified patent and that said Letters Patent is hereby corrected as shown below:

In the Specifications:

In Column 2, Line 67, delete "RFSSS" and insert -- RFSSs --, therefor.

Signed and Sealed this
Fourteenth Day of May, 2013

Teresa Stanek Rea
*Acting Director of the United States Patent and Trademark Office*